United States Patent
Mio et al.

(10) Patent No.: US 12,473,668 B2
(45) Date of Patent: Nov. 18, 2025

(54) FLAME-RETARDANT MODACRYLIC FIBER, METHOD FOR PRODUCING THE SAME, AND FLAME-RETARDANT FIBER COMPOSITE AND FLAME-RETARDANT WORK CLOTHING INCLUDING THE SAME

(71) Applicant: KANEKA CORPORATION, Osaka (JP)

(72) Inventors: Wataru Mio, Hyogo (JP); Akira Ozaki, Hyogo (JP); Shinya Nakamura, Hyogo (JP); Keita Uchibori, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 18/776,649

(22) Filed: Jul. 18, 2024

(65) Prior Publication Data

US 2024/0384446 A1 Nov. 21, 2024

Related U.S. Application Data

(63) Continuation of application No. PCT/JP2023/005409, filed on Feb. 16, 2023.

(30) Foreign Application Priority Data

Mar. 9, 2022 (JP) .................... 2022-036295

(51) Int. Cl.
| | |
|---|---|
| *D02G 3/44* | (2006.01) |
| *D01F 1/07* | (2006.01) |
| *D01F 6/40* | (2006.01) |
| *D02G 3/04* | (2006.01) |
| *D04B 1/16* | (2006.01) |
| *D04B 1/24* | (2006.01) |
| *D04B 21/16* | (2006.01) |
| *D04B 21/20* | (2006.01) |

(52) U.S. Cl.
CPC ............... *D02G 3/443* (2013.01); *D01F 1/07* (2013.01); *D01F 6/40* (2013.01); *D02G 3/045* (2013.01); *D04B 1/16* (2013.01); *D04B 1/24* (2013.01); *D04B 21/16* (2013.01); *D04B 21/207* (2013.01); *D10B 2201/22* (2013.01); *D10B 2321/101* (2013.01); *D10B 2401/04* (2013.01); *D10B 2501/04* (2013.01)

(58) Field of Classification Search
None
See application file for complete search history.

(56) References Cited

U.S. PATENT DOCUMENTS

| | | | |
|---|---|---|---|
| 4,863,797 A | 9/1989 | Ichibori et al. | |
| 2006/0234592 A1 | 10/2006 | Mio et al. | |
| 2008/0057807 A1 | 3/2008 | Tutterow et al. | |
| 2015/0191854 A1* | 7/2015 | Tanaka | C08F 214/18 |
| | | | 524/406 |
| 2022/0408864 A1 | 12/2022 | Tanaka | |

FOREIGN PATENT DOCUMENTS

| | | |
|---|---|---|
| EP | 183014 A2 | 6/1986 |
| EP | 1619278 A1 | 1/2006 |
| EP | 2899302 A1 | 7/2015 |
| EP | 4063547 A1 | 9/2022 |
| JP | H04018050 B2 | 3/1992 |
| JP | H10001822 A | 1/1998 |
| JP | H11001842 A | 1/1999 |
| JP | 2000290827 A | 10/2000 |
| JP | 2004197255 A | 7/2004 |
| JP | 2007270410 A | 10/2007 |
| JP | 2010502849 A | 1/2010 |
| JP | 2016044386 A | 4/2016 |
| WO | 2004097088 A1 | 11/2004 |
| WO | 2008027454 A1 | 3/2008 |
| WO | 2014046087 A1 | 3/2014 |
| WO | 2016194766 A1 | 12/2016 |
| WO | 2021100387 A1 | 5/2021 |

OTHER PUBLICATIONS

International Search Report issued in corresponding International Application No. PCT/JP2023/005409, dated Apr. 18, 2023, with translation (7 pages).

* cited by examiner

*Primary Examiner* — Arti Singh-Pandey
(74) *Attorney, Agent, or Firm* — Osha Bergman Watanabe & Burton LLP

(57) ABSTRACT

A flame-retardant modacrylic fiber including a modacrylic copolymer in an amount of 100 parts by mass, and a zinc stannate compound in an amount of 1 to 18 parts by mass, wherein the zinc stannate compound has an average particle size D50 of 0.5 μm or more is provided. Further, a flame-retardant fiber composite and a flame-retardant work clothing including the flame-retardant modacrylic fiber in an amount of 30 to 80 mass %, and one or more other fibers selected from the group consisting of natural fibers and chemical fibers in an amount of 20 to 70 mass % are provided.

15 Claims, No Drawings

FLAME-RETARDANT MODACRYLIC FIBER, METHOD FOR PRODUCING THE SAME, AND FLAME-RETARDANT FIBER COMPOSITE AND FLAME-RETARDANT WORK CLOTHING INCLUDING THE SAME

TECHNICAL FIELD

One or more embodiments of the present invention relate to a flame-retardant modacrylic fiber with improved flame retardancy while being environmentally friendly, a method for producing the flame-retardant modacrylic fiber, a flame-retardant fiber composite and flame-retardant work clothing, each including the flame-retardant modacrylic fiber.

BACKGROUND

Conventionally, halogen-containing fibers such as modacrylic fibers have generally been made flame retardant by adding about 1 to about 50 parts by mass of antimony compounds as flame retardants (for example, Patent Document 1). However, since antimony compounds may affect the environment and the human body, flame retardants other than the antimony compound are being considered. For example, in Patent Documents 2 and 3, zinc-based compounds have been used to impart flame retardancy to halogen-containing fibers in addition to antimony compounds.

Patent Document 1: JP H4 (1992)-18050A
Patent Document 2: JP H10 (1998)-001822A
Patent Document 3: JP H11 (1999)-1842A However, in Patent Document 2, the halogen-containing fibers contain 20 to 50% by weight of zinc stannate compounds, so there was a problem of high cost. Furthermore, the modacrylic fibers described in Patent Document 3 when used in combination with other fibers, such as cellulose fibers, and used for working clothes, the flame retardancy may not be sufficient.

SUMMARY

One or more embodiments of the present invention provide a flame-retardant modacrylic fiber that exhibits high flame retardancy, even when used in combination with other fibers such as cellulose fibers, at a reduced cost while being environmentally friendly, a method for producing the flame-retardant modacrylic fiber, and a flame-retardant fiber composite and flame-retardant work clothing each including the flame-retardant modacrylic fiber.

One or more embodiments of the present invention relate to a flame-retardant modacrylic fiber including a modacrylic copolymer in an amount of 100 parts by mass, and a zinc stannate compound in an amount of 1 to 18 parts by mass, wherein the zinc stannate compound has an average particle size D50 of 0.5 µm or more.

One or more embodiments of the present invention relate to a method for producing the flame-retardant modacrylic fiber. The method includes wet-spinning a spinning solution containing a modacrylic copolymer, a zinc stannate compound, and a solvent, wherein the spinning solution contains the zinc stannate compound in an amount of 1 to 18 parts by mass with respect to 100 parts by mass of the modacrylic copolymer. In the spinning solution, an average particle size D50 of the zinc stannate compound is 0.5 µm or more.

One or more embodiments of the present invention relate to a flame-retardant fiber composite including the flame-retardant modacrylic fiber in an amount of 30 to 80 mass %, and one or more other fibers selected from the group consisting of natural fibers and chemical fibers in an amount of 20 to 70 mass %.

One or more embodiments of the present invention relate to flame-retardant work clothing including the flame-retardant fiber composite.

One or more embodiments of the present invention provide a flame-retardant modacrylic fiber that exhibits high flame retardancy, even when used in combination with other fibers such as cellulose fibers, at a reduced cost while being environmentally friendly, and a flame-retardant fiber composite and flame-retardant work clothing each containing the flame-retardant modacrylic fiber.

DETAILED DESCRIPTION

The inventors have conducted in-depth studies to improve the flame retardancy of a modacrylic fiber while being environmentally friendly. As a result, the inventors found that the flame retardancy of a modacrylic fiber can be improved by using zinc stannate compounds having an average particle size D50 of 0.5 µm or more as flame retardants. Particularly, the inventors found that the flame retardancy of a flame-retardant fiber composite that uses the flame-retardant modacrylic fiber in combination with other fibers such as cellulose fibers can be significantly improved. Further, the flame-retardant fiber composite exhibits excellent flame retardancy (flameproofness) in a flammability test used to evaluate flame retardancy standards for work clothing, for example in a flammability test based on ISO 15025:2016.

Conventionally, when a flame retardant was incorporated into a fiber, the upper limit of the particle size of the flame retardant was adjusted from the viewpoint of spinnability. Further, it is generally assumed that as the particle size of a flame retardant decreases, the surface area of the flame retardant increases, and reactions by the flame retardant that inhibit combustion are more likely to occur. In one or more embodiments of the present invention, although the reason is not clear, when a zinc stannate compound was incorporated into a modacrylic fiber, it was found that when the particle size of the zinc stannate compound is smaller than a threshold value, an extinguishing property of the modacrylic fiber significantly deteriorated, in particular, a flame-retardant fiber composite that used the modacrylic fiber in combination with other fibers such as cellulose fibers become difficult to meet flame retardancy standards for work clothing.

In this specification, when a numerical range is shown using "to", that includes the values at both ends (i.e., the upper limit and the lower limit). For example, a numerical range "A to B" is a range that includes A and B, which are the values at the two ends of the range. Also, when a plurality of numerical ranges is described in this specification, numerical ranges obtained by using the upper limits and the lower limits of the different numerical ranges in combination as appropriate are included.

The zinc stannate compound has an average particle size D50 of 0.5 µm or more. From the viewpoint of improving flame retardancy of the flame-retardant modacrylic fiber, the flame-retardant fiber composite, and the flame-retardant work clothing, the average particle size D50 of the zinc stannate compound may be 0.6 µm or more or 0.7 µm or more. There is no particular limitation on the upper limit of the average particle size D50 of the zinc stannate compound, from the viewpoint of spinnability and fiber strength of flame-retardant modacrylic fiber, it may be 5 µm or less, 3

µm or less, or 2 µm or less. In this specification, the average particle size of a compound such as a zinc stannate compound can be measured by a laser diffraction/scattering method or a dynamic light scattering method using a dispersion (liquid dispersion) obtained by dispersing the compound in water or an organic solvent.

The zinc stannate compound may be zinc stannate ($ZnSnO_3$) or zinc hydroxystannate ($ZnSn(OH)_6$). Among them, for example, zinc hydroxystannate may be preferable from the viewpoint of improving flame retardancy of the flame-retardant modacrylic fiber, the flame-retardant fiber composite, and the flame-retardant work clothing.

The modacrylic copolymer may contain acrylonitrile, one or more halogen-containing monomers, and one or more other copolymerizable vinyl monomers. From the viewpoint of heat resistance and flame retardancy, the modacrylic copolymer may contain acrylonitrile in an amount of 30 to 85 mass %, one or more halogen-containing monomers in an amount of 15 to 75 mass %, and one or more other copolymerizable vinyl monomers in an amount of 0 to 3 mass %. The modacrylic copolymer may contain acrylonitrile in an amount of 35 to 75 mass %, one or more halogen-containing monomers in an amount of 25 to 65 mass %, and one or more other copolymerizable vinyl monomers in an amount of 0 to 3 mass %. The modacrylic copolymer may contain acrylonitrile in an amount of 30 to 60 mass %, one or more halogen-containing monomers in an amount of 40 to 70 mass %, and one or more other copolymerizable vinyl monomers in an amount of 0 to 3 mass %. The halogen-containing monomers contain one or more selected from the group consisting of halogen-containing vinyl monomers and halogen-containing vinylidene monomers. The other copolymerizable vinyl monomers are not particularly limited as long as it is copolymerizable with acrylonitrile.

Examples of the halogen-containing vinyl monomers include vinyl chloride and vinyl bromide. Examples of the halogen-containing vinylidene monomers include vinylidene chloride and vinylidene bromide. The halogen-containing monomers may be used alone or in combination of two or more. Of these, one or more selected from the group consisting of vinyl chloride and vinylidene chloride is preferred, and vinylidene chloride is more preferred.

Examples of the other copolymerizable vinyl monomers include, but not particularly limited to: unsaturated carboxylic acids typified by acrylic acids and methacrylic acids, as well as salts thereof; esters of unsaturated carboxylic acids, typified by methacrylic esters (such as methyl methacrylate), glycidyl methacrylate and the like; vinyl esters typified by vinyl acetate and vinyl butyrate; and sulfonic acid-containing monomers. Examples of the sulfonic acid-containing monomers include, but not particularly limited to, allylsulfonic acid, methallylsulfonic acid, styrenesulfonic acid, isoprenesulfonic acid, and 2-acrylamide-2-methylpropanesulfonic acid, as well as metal salts, such as sodium salts, and amine salts thereof. The other copolymerizable vinyl monomers may be used alone, or two or more of them may be used in combination. The sulfonic acid-containing monomers may be used as necessary, when the modacrylic copolymer contains 3 mass % or less of the sulfonic acid-containing monomers, the production stability in the spinning process will be excellent.

The modacrylic copolymer may contain acrylonitrile in an amount of 35 to 75 mass %, vinyl chloride and/or vinylidene chloride in an amount of 25 to 65 mass %, and the other copolymerizable vinyl monomers in an amount of 0 to 3 mass %. The modacrylic copolymer may contain acrylonitrile in an amount of 40 to 70 mass %, vinyl chloride and/or vinylidene chloride in an amount of 30 to 60 mass %, and the other copolymerizable vinyl monomers in an amount of 0 to 3 mass %, from the viewpoint of further improving the handleability and flame retardancy. The modacrylic copolymer may contain acrylonitrile in an amount of 35 to 75 mass %, vinylidene chloride in an amount of 25 to 65 mass %, and the other copolymerizable vinyl monomers in an amount of 0 to 3 mass %. The modacrylic copolymer may contain acrylonitrile in an amount of 40 to 70 mass %, vinylidene chloride in an amount of 30 to 60 mass %, and the other copolymerizable vinyl monomers in an amount of 0 to 3 mass %.

The modacrylic copolymer may be obtained by a known polymerization method such as bulk polymerization, suspension polymerization, emulsion polymerization, or solution polymerization. Of these, suspension polymerization, emulsion polymerization, or solution polymerization is preferable from industrial standpoint.

In one or more embodiments of the present invention, the flame-retardant modacrylic fiber contains the zinc stannate compound in an amount of 1 to 18 parts by mass with respect to 100 parts by mass of the modacrylic copolymer. The flame-retardant modacrylic fiber may contain the zinc stannate compound in an amount of 2 parts by mass or more, 3 parts by mass or more, or 4 parts by mass or more, with respect to 100 parts by mass of the modacrylic copolymer, from the viewpoint of easily meeting the flame retardancy criteria for work clothing evaluated in flammability tests, particularly in a flammability test based on ISO 15025:2016. Further, in one or more embodiments of the present invention, the flame-retardant modacrylic fiber preferably may contain the zinc stannate compound in an amount of 16 parts by mass or less, 15 parts by mass or less, 14 parts by mass or less, or 13 parts by mass or less, with respect to 100 parts by mass of the modacrylic copolymer, from the viewpoint of fiber strength, spinnability, stain inhibition, dye-affinity, and the like.

The flame-retardant modacrylic fiber may contain 1.0 to 15.3 mass %, 2.0 to 13.8 mass %, 2.5 to 13.0 mass %, 3.0 to 12.3 mass % or 3.5 to 11.5 mass % of the zinc stannate compound, with respect to the total mass of the flame-retardant modacrylic fiber, from the viewpoint of compatibility between fiber strength and flame retardancy. In this specification, the content of the zinc stannate compound in the flame-retardant modacrylic fiber can be measured by fluorescence X-ray analysis.

In one or more embodiments of the present invention, the flame-retardant modacrylic fiber may contain one or more other additives such as an antistatic agent, a thermal coloration inhibitor, a light resistance improver, a whiteness improver, a devitrification inhibitor, and a colorant, when necessary.

In one or more embodiments of the present invention, either a short fiber or a long fiber may be used as the flame-retardant modacrylic fiber, and which of the fibers should be used can be selected as appropriate depending on the method of use. The single fiber fineness of the flame-retardant modacrylic fiber, which is selected as appropriate depending on the intended use of the flame-retardant fiber composite or textile products to be used, may be 1 to 50 dtex, 1.5 to 30 dtex or 1.7 to 15 dtex. The fiber length of the flame-retardant modacrylic fiber is selected as appropriate depending on the intended use of the flame-retardant fiber composite or textile products. For example, a short cut fiber (fiber length: 0.1 to 5 mm), a short fiber (fiber length: 15 to 176 mm, 20 to 160 mm, 25 to 138 mm, or 30 to 128 mm), or a long fiber that is not cut at all (filament fiber) may be used.

In one or more embodiments of the present invention, the flame-retardant modacrylic fiber may have a single fiber strength of 1.0 to 4.0 cN/dtex or 1.5 to 3.5 cN/dtex, from the viewpoint of durability, for example. In one or more embodiments of the present invention, the flame-retardant modacrylic fiber may have an elongation of 20 to 40% or 20 to 30%, from the viewpoint of practical utility, for example. In this specification, the single fiber strength and the elongation of the flame-retardant modacrylic fiber can be measured in a manner that complies with JIS L 1015.

In one or more embodiments of the present invention, the flame-retardant modacrylic fiber may be produced by, but not particularly limited to, spinning a composition that contains the modacrylic copolymer and the zinc stannate compound. Specifically, the above procedure may be carried out by a known method such as a wet spinning method, a dry spinning method, and a dry-wet spinning method. The flame-retardant modacrylic fiber may be produced by the wet spinning a spinning solution that contains the modacrylic copolymer, the zinc stannate compound, and a solvent. The spinning solution may contain the zinc stannate compound in an amount of 1 to 18 parts by mass with respect to 100 parts by mass of the modacrylic copolymer. In the spinning solution, the average particle size D50 of the zinc stannate compound may be 0.5 μm or more. The spinning solution may be obtained by dissolving the modacrylic copolymer in the solvent and adding the zinc stannate compound to the obtained solution of the modacrylic copolymer. Also, the spinning solution may be obtained by adding a solution of the modacrylic copolymer which is obtained by dissolving the modacrylic copolymer in the solvent to a solution of the zinc stannate compound which is obtained by dissolving the zinc stannate compound in the solvent. The flame-retardant modacrylic fiber can be produced in the same manner as in a common wet spinning of a modacrylic fiber, except using the above-described spinning solution. Specifically, the flame-retardant modacrylic fiber may be produced by extruding the above-described spinning solution into a coagulation bath through a nozzle to coagulate it, then subjecting coagulated filaments to drawing, washing with water, and drying. After drying, when necessary, the obtained filaments may be subject to drawing and heat treatment (heat relaxing treatment). Further, the obtained filaments may be crimped and cut into any desired length when necessary. Examples of the solvent include organic solvents such as dimethylformamide, dimethylacetamide, acetone, and dimethyl sulfoxide, and inorganic solvents such as a rhodan salt aqueous solution, and a nitric acid aqueous solution. In the flame-retardant modacrylic fiber obtained through wet spinning, the average particle size D50 of the zinc stannate compound may be substantially the same as the average particle size D50 of the zinc stannate compound in the spinning solution. So, the average particle size D50 of the zinc stannate compound in the flame-retardant modacrylic fiber may be indicated by the average particle size D50 of the zinc stannate compound in the spinning solution.

Also, the average particle size D50 of the zinc stannate compound in the flame-retardant modacrylic fiber may be confirmed by measuring and calculating the particle size distribution of insoluble matter in a dispersion of insoluble matter, which is obtained by dissolving the flame-retardant modacrylic fiber in a solvent, by using a laser diffraction method or a dynamic light scattering method. As the solvent, organic solvents used in preparing the spinning solution described above may be used as appropriate.

In one or more embodiments of the present invention, the flame-retardant modacrylic fiber may be used alone, or in combination with other fibers such as natural fibers, regenerated fibers, and other synthetic fibers other than the flame-retardant modacrylic fiber.

In one or more embodiments of the present invention, the flame-retardant fiber composite contains the flame-retardant modacrylic fiber. The flame-retardant fiber composite may include a flame-retardant fiber mixture. The flame-retardant fiber mixture may be formed by combining the flame-retardant modacrylic fiber and one or more other fibers.

In one or more embodiments of the present invention, either a short fiber or a long fiber may be used as the other fibers, and which of the fibers should be used can be selected as appropriate depending on the method of use. The single fiber fineness of the other fibers, which is selected as appropriate depending on the intended use of the flame-retardant fiber composite or textile products to be used, may be 1 to 50 dtex, 1.5 to 30 dtex or 1.7 to 15 dtex. The fiber length of the other fibers is selected as appropriate depending on the intended use of flame-retardant fiber composite or textile products. For example, a short cut fiber (fiber length: 0.1 to 5 mm), a short fiber (fiber length: 15 to 176 mm, 20 to 160 mm, 25 to 138 mm, or 30 to 128 mm), or a long fiber (filament fiber) may be used.

The flame-retardant fiber composite may contain the flame-retardant modacrylic fiber in an amount of 30 to 80 mass % and one or more other fibers selected from the group consisting of natural fibers and chemical fibers in an amount of 20 to 70 mass %. Thereby, the flame-retardant fiber composite may maintain high flame retardancy while characteristics of the other fibers may be imparted to the flame-retardant fiber composite. The flame-retardant fiber composite may contain the flame-retardant modacrylic fiber in an amount of 35 to 75 mass % and one or more other fibers selected from the group consisting of natural fibers and chemical fibers in an amount of 25 to 65 mass %, and still may contain the flame-retardant modacrylic fiber in an amount of 40 to 75 mass % and one or more other fibers selected from the group consisting of natural fibers and chemical fibers in an amount of 25 to 60 mass %.

Examples of the natural fibers include: natural cellulose fibers such as cotton fibers, kapok fibers, linen fibers, hemp fibers, ramie fibers, jute fibers, Manila hemp fibers, and kenaf fibers; and natural animal fibers such as wool fibers, mohair fibers, cashmere fibers, camel fibers, alpaca fibers, angora fibers, and silk fibers.

Examples of the regenerated fibers include: regenerated cellulose fibers such as rayon, polynosic, cupra, and lyocell; regenerated collagen fibers; regenerated protein fibers; cellulose acetate fibers; and promix fibers.

Examples of the synthetic fibers include polyester fibers, polyamide fibers, polylactic acid fibers, acrylic fibers, polyolefin fibers (including polyethylene fibers, polypropylene fibers, and the like), polyvinyl alcohol fibers, polyvinyl chloride fibers, polyvinylidene chloride fibers, polychlal fibers, polyurethane fibers, polyoxymethylene fibers, polytetrafluoroethylene fibers, aramid fibers, benzoate fibers, polyphenylene sulfide fibers, polyetheretherketone fibers, polybenzazole fibers, polyimide fibers, and polyamide-imide fibers. In addition, flame-retardant polyester, polyethylene naphthalate fibers, melamine fibers, acrylate fibers, polybenzoxide fibers, and the like also can be used as the synthetic fibers. Other examples of the synthetic fibers include oxidized acrylic fibers, carbon fibers, glass fibers, and activated carbon fibers.

Of these, natural fibers, regenerated cellulose fibers, polyester fibers, aramid fibers, and melamine fibers are preferable.

The above-described other fibers may be used alone, or two or more of them may be used in combination.

The flame-retardant fiber composite may include those obtained by fiber blending, mixed spinning, and filament blending, conjugated yarns such as paralleled yarns, folded yarns, and sheath-core yarns, and those obtained by mixed weaving, mixed knitting, and laminating. The specific form of the flame-retardant fiber composite may be cotton for use as stuffing or the like, a spun yarn, a nonwoven fabric, a woven fabric, a knitted fabric, a braided fabric, or the like.

Examples of the cotton for use as stuffing and the like include opened cotton, ball-like cotton, webs, and molded cotton.

Examples of the spun yarn include ring spun yarns, air spun yarns, and air jet spun yarns.

Examples of the nonwoven fabric include wet-laid nonwoven fabrics, carded nonwoven fabrics, air-laid nonwoven fabrics, thermal bonded nonwoven fabrics, chemical bonded nonwoven fabrics, needle-punched nonwoven fabrics, hydro-entangled nonwoven fabrics, and stitch bonded nonwoven fabrics. Thermal bonded nonwoven fabrics and needle-punched nonwoven fabrics are industrially inexpensive. The nonwoven fabric may have any structure that is uniform in the thickness, width, and length directions, a distinctive laminate structure, and an indistinct laminated structure.

Examples of the woven fabric include plain weave fabrics, twill weave fabrics, satin weave fabrics, irregular plain weave fabrics, irregular twill weave fabrics, irregular satin weave fabrics, fancy weave fabrics, Jacquard weave fabrics, woven fabrics using two or more types of yarn for either one of the warp and the weft, double weave fabrics, multiple weave fabrics, warp pile woven fabrics, weft pile woven fabrics, and leno weave fabrics. Plain weave fabrics, satin weave fabrics, and Jacquard weave fabrics exhibit excellent texture, strength, and the like as commercial products.

Examples of the knitted fabric include circular knitted fabrics, weft knitted fabrics, warp knitted fabrics, and pile knitted fabrics, and examples thereof include plain stitch fabrics, jersey stitch fabrics, rib stitch fabrics, smooth knitted fabrics (interlock stitch fabrics), elastic rib stitch fabrics, purl stitch fabrics, denbigh stitch structures, cord stitch structures, atlas stitch structures, chain stitch structures, and laid-in structures. Of these, jersey stitch fabrics and rib stitch fabrics are excellent in texture as commercial products.

The flame-retardant modacrylic fiber and the flame-retardant fiber composite may be used in various textile products (applications). Examples of textile products include the following products.

(1) Clothing and Materials of Daily Necessities

Clothes (including jackets, underwear, sweaters, vests, trousers, and the like), gloves, socks, mufflers, hats, bedding, pillows, cushions, stuffed toys, and the like (2) Special Purpose Clothing Work clothing worn by workers who handle fire including protective clothing and firefighting clothing, cold weather clothing, and the like (3) Interior Materials Chair upholstery, curtains, wallpaper, carpets, and the like (4) Industrial Materials Filters, flame-resistant stuffing, lining materials, and the like From the viewpoint of high flame retardancy (flameproofness), afterflame time of the flame-retardant fiber composite, measured using a flammability test based on ISO 15025: 2016, may be 10 seconds or less, 5 seconds or less, 3 seconds or less or 2.0 seconds or less. The flame-retardant fiber composite is suitable for use in work clothing for fire-handling operations such as protective clothing and firefighting clothing.

As the flame-retardant fiber composite for work clothing for fire-handling operations such as protective clothing and firefighting clothing, flame-retardant fabrics such as woven fabrics and/or knitted fabrics including the following fibers in the amounts shown below may be suitably used. The use of cellulose fibers in combination with the flame-retardant modacrylic fiber can provide moisture absorbency and comfort to the flame-retardant fabrics and the flame-retardant work clothing. If the content of cellulose fibers is less than 20 mass %, comfort may be difficult to maintain.

(1) A flame-retardant fabric including the flame-retardant modacrylic fiber in an amount of 30 to 80 mass % and cellulose fibers (natural cellulose fibers and/or regenerated cellulose fibers) in an amount of 20 to 70 mass %

(2) A flame-retardant fabric including the flame-retardant modacrylic fiber in an amount of 35 to 75 mass % and cellulose fibers (natural cellulose fibers and/or regenerated cellulose fibers) in an amount of 25 to 65 mass %

(3) A flame-retardant fabric including the flame-retardant modacrylic fiber in an amount of 40 to 70 mass % and cellulose fibers (natural cellulose fibers and/or regenerated cellulose fibers) in an amount of 30 to 60 mass %

From the viewpoint of further improving flame retardancy, flame-retardant fabrics such as woven fabrics and/or knitted fabrics including the following fibers in the amounts shown below may be suitably used as the flame-retardant fiber composite for work clothing for fire-handling operations such as protective clothing and firefighting clothing. Surprisingly, a flame-retardant fabric (a flame-retardant fiber composite) that uses the flame-retardant modacrylic fiber containing the zinc stannate compound in combination with lyocell shows significantly improved flame retardancy, particularly, exhibits excellent flame retardancy (flameproofness) in the flammability test based on ISO 15025:2016.

(1) A flame-retardant fabric including the flame-retardant modacrylic fiber in an amount of 30 to 80 mass % and lyocell in an amount of 20 to 70 mass %

(2) A flame-retardant fabric including the flame-retardant modacrylic fiber in an amount of 35 to 75 mass % and lyocell in an amount of 25 to 65 mass %

(3) A flame-retardant fabric including the flame-retardant modacrylic fiber in an amount of 40 to 70 mass % and lyocell in an amount of 30 to 60 mass %

Although there is no particular limitation on the basis weight of the flame-retardant fabric, the basis weight is preferably 150 to 400 g/m2, more preferably 200 to 380 g/m2, and even more preferably 220 to 350 g/m2 from the viewpoint of texture.

EXAMPLES

One or more embodiments of the present invention will be described more specifically with reference to examples. It is to be noted, however, that the present invention is not limited to the following examples.

The measurement and evaluation methods used in examples and comparative examples are as follows.

Average Particle Size D50

The average particle size D50 of a compound was determined by measuring the particle size distribution of a compound in a dispersion solution of the compound by the laser diffraction method or the dynamic light scattering method using a laser scattering particle size distribution analyzer (Laser Scattering Particle Size Distribution Analyzer LA-950V2, manufactured by HORIBA, Ltd.).

Flame Retardancy

The flame retardancy was evaluated by a flammability test based on procedure A of ISO 15025:2016. In the flammability test based on procedure A of ISO 15025:2016, a flame (height level: 25±2 mm) is ignited for 10 seconds at a distance of 17±1 mm at right angles to an evaluation sample set in the specified holder.

Example 1

<Production of Modacrylic Fibers>

A modacrylic copolymer containing 51 mass % of acrylonitrile, 48 mass % of vinylidene chloride, and 1 mass % of sodium p-styrenesulfonate was dissolved in dimethyl sulfoxide such that the modacrylic copolymer concentration was 30 mass %. A zinc hydroxystannate dispersion was added to the obtained modacrylic copolymer solution so that 4 parts by mass of zinc hydroxystannate was added with respect to 100 parts by mass of the modacrylic copolymer, and thus a spinning solution was obtained. The zinc hydroxystannate dispersion was prepared by adding zinc hydroxystannate ($ZnSn(OH)_6$, manufactured by SCL Italia. Spa, product name "Zinflam (registered trademark) ZHS") to dimethyl sulfoxide at a concentration of 30 mass % and passing the obtained mixture three passes through a bead mill machine ("DYNO-MILL RESEARCH LAB", manufactured by Shinmaru Enterprises Corporation) using beads of 1.5 µm diameter to disperse zinc hydroxystannate uniformly. The average particle size D50 of zinc hydroxystannate in the zinc hydroxystannate dispersion was 1.0 µm. The obtained spinning solution was extruded into a 50 mass % aqueous solution of dimethyl sulfoxide through a 300-hole nozzle with a nozzle hole diameter of 0.08 mm and coagulated, followed by washing with water and drying at 120° C. The obtained filaments were drawn to 3 times their original length, followed by heat treatment at 145° C. for 5 minutes. Thus, modacrylic fibers were obtained. The obtained modacrylic fibers of Example 1 had a single fiber fineness of 1.7 dtex, and a cut length of 38 mm.

<Production of Flame-Retardant Fiber Composite>

The modacrylic fibers obtained through the above-described process and lyocell ("TENCEL (registered trademark)", manufactured by Lenzing AG) were blended together at ratios shown in Table 1 below, the resulting fiber blend was opened with a carding machine ("sample roller card SC-500", manufactured by DIAWAKIKO Co., LTD.) and produced into slivers using a small drawing machine ("TSM-DFS", manufactured by INTEC Co., LTD.). Then, the obtained slivers were produced into rovings by a high-speed roving frame ("FL200", manufactured by TOYOTA INDUSTRIES CORPORATION), and the obtained rovings were produced into 20/1 count spun yarns by a high-speed spinning frame ("UA37", manufactured by Howa Machinery, Ltd.). A single knit fabric having a basis weight shown in Table 1 was produced by a computerized flat knitting machine ("SSG 122FC", manufactured by SHIMA SEIKI MFG., LTD.) using the obtained spun yarns.

Example 2

<Production of Modacrylic Fiber>

Modacrylic fibers were produced in the same manner as in Example 1, except using a zinc hydroxystannate dispersion in which the average particle size D50 of zinc hydroxystannate was 0.7 µm. The zinc hydroxystannate dispersion was prepared in the same manner as in Example 1, except using beads of 0.5 µm diameter. The obtained modacrylic fibers of Example 2 had a single fiber fineness of 1.8 dtex, and a cut length of 38 mm.

<Production of Flame-Retardant Fiber Composite>

Spun yarns and a single knit fabric were produced in the same manner as in Example 1, except that the modacrylic fibers obtained through the above-described process were used.

Comparative Example 1

<Production of Modacrylic Fiber>

Modacrylic fibers were produced in the same manner as in Example 1, except using a zinc hydroxystannate dispersion in which the average particle size D50 of the zinc hydroxystannate was 0.4 µm. The zinc hydroxystannate dispersion was prepared in the same manner as in Example 1, except using beads of 0.1 µm diameter. The obtained modacrylic fibers of Comparative Example 1 had a single fiber fineness of 1.8 dtex, and a cut length of 38 mm.

<Production of Flame-Retardant Fiber Composite>

Spun yarns and a single knit fabric were produced in the same manner as in Example 1, except that the modacrylic fibers obtained through the above-described process were used.

Comparative Example 2

<Production of Modacrylic Fiber>

Modacrylic fibers were produced in the same manner as in Example 1, except using a zinc hydroxystannate dispersion in which the average particle size D50 of zinc hydroxystannate was 0.2 µm. The zinc hydroxystannate dispersion was prepared in the same manner as in Example 1, except six passes through the bead mill machine using beads of 0.1 µm diameter. The obtained modacrylic fibers of Comparative Example 2 had a single fiber fineness of 1.7 dtex, and a cut length of 38 mm.

<Production of Flame-Retardant Fiber Composite>

Spun yarns and a single knit fabric were produced in the same manner as in Example 1, except that the modacrylic fibers obtained through the above-described process were used.

Reference Example 1

Modacrylic fibers were produced in the same manner as in Example 1, except that a molybdenum trioxide dispersion was used instead of the zinc hydroxystannate dispersion. The molybdenum trioxide dispersion was prepared by adding molybdenum trioxide (manufactured by NIPPON INORGANIC COLOUR & CHEMICAL CO., LTD.) to dimethyl sulfoxide at a concentration of 30 mass % and passing the obtained mixture one pass through a bead mill machine ("DYNO-MILL RESEARCH LAB", manufactured by Shinmaru Enterprises Corporation) using beads of 1.25 mm diameter to disperse molybdenum trioxide uniformly. The average particle size D50 of molybdenum trioxide in the molybdenum trioxide dispersion was 1.4 μm. The obtained modacrylic fibers of Reference Example 1 had a single fiber fineness of 1.8 dtex, and a cut length of 38 mm.
<Production of Flame-Retardant Fiber Composite>

Spun yarns and a single knit fabric were produced in the same manner as in Example 1, except that the modacrylic fibers obtained through the above-described process were used.

Reference Example 2

<Production of Modacrylic Fiber>

Modacrylic fibers were produced in the same manner as in Reference Example 1, except using a molybdenum trioxide dispersion in which the average particle size D50 of molybdenum trioxide was 0.14 μm. The molybdenum trioxide dispersion was prepared in the same manner as in Reference Example 1, except three passes through the bead mill machine using beads of 0.1 μm diameter. The obtained modacrylic fibers of Reference Example 1 had a single fiber fineness of 1.8 dtex, and a cut length of 38 mm.
<Production of Flame-Retardant Fiber Composite>

Spun yarns and a single knit fabric were produced in the same manner as in Example 1, except that the modacrylic fibers obtained through the above-described process were used.

Reference Example 3

Modacrylic fibers were produced in the same manner as in Example 1, except a tin dioxide dispersion was used instead of the zinc hydroxystannate dispersion. The tin dioxide dispersion was prepared by adding tin dioxide (manufactured by Showa Kako Corp.) to dimethyl sulfoxide at a concentration of 30 mass % and passing the obtained mixture one pass through a bead mill machine ("DYNO-MILL RESEARCH LAB", manufactured by Shinmaru Enterprises Corporation) using beads of 1.25 mm diameter to disperse tin dioxide uniformly. The average particle size D50 of tin dioxide in the tin dioxide dispersion was 2.0 μm. The obtained modacrylic fibers of Reference Example 3 had a single fiber fineness of 1.9 dtex, and a cut length of 38 mm.
<Production of Flame-Retardant Fiber Composite>

Spun yarns and a single knit fabric were produced in the same manner as in Example 1, except that the modacrylic fibers obtained through the above-described process were used.

Reference Example 4

<Production of Modacrylic Fiber>

Modacrylic fibers were produced in the same manner as in Reference Example 1, except using a tin dioxide dispersion in which the average particle size D50 of tin dioxide was 0.02 μm. The tin dioxide dispersion was prepared in the same manner as in Reference Example 1, except ten passes through the bead mill machine using beads of 0.1 μm diameter. The obtained modacrylic fibers of Reference Example 4 had a single fiber fineness of 1.9 dtex, and a cut length of 38 mm.
<Production of Flame-Retardant Fiber Composite>

Spun yarns and a single knit fabric were produced in the same manner as in Example 1, except that the modacrylic fibers obtained through the above-described process were used.

The flame retardancy of the single knit fabric obtained in each of the Examples, Comparative Examples, and Reference Examples were evaluated as described above. The results (afterflame time) obtained are shown in Table 1 below. Table 1 below, the amounts of flame retardant in modacrylic fibers refer to 100 parts by mass of the modacrylic copolymer.

TABLE 1

| | Blend ratio (parts by mass) | | Flame retardant in Modacrylic fibers | | | | |
|---|---|---|---|---|---|---|---|
| | Modacrylic fibers | Lyocell | Kind | Average particle size D50 (μm) | Amount (parts by mass) | Basis weight (g/m$^2$) | Afterflame time (seconds) |
| Ex. 1 | 40 | 60 | Zinc hydroxystannate | 1.0 | 4 | 264 | 0.8 |
| Ex. 2 | 40 | 60 | | 0.7 | 4 | 231 | 0.6 |
| Comp. Ex. 1 | 40 | 60 | | 0.4 | 4 | 225 | 14 |
| Comp. Ex. 2 | 40 | 60 | | 0.2 | 4 | 279 | Burn down |
| Ref. Ex. 1 | 50 | 50 | Molybdenum trioxide | 1.4 | 4 | 216 | 48 |
| Ref. Ex. 2 | 50 | 50 | | 0.14 | 4 | 205 | 0 |
| Ref. Ex. 3 | 50 | 50 | Tin dioxide | 2 | 4 | 203 | 49 |
| Ref. Ex. 4 | 50 | 50 | | 0.02 | 4 | 225 | 37 |

As shown in Table 1 above, in Examples 1 and 2, the afterflame time measured by the flammability test based on procedure A of ISO 15025:2016 was 1.0 seconds or less. The flame-retardant fiber composites of Examples 1 and 2 had extremely high flame retardancy (flameproofness) and were suitable as fabrics for flame-retardant work clothing.

Meanwhile, in Comparative Example 1 using modacrylic fibers containing zinc hydroxystannate with the average particle size D50 of 0.4 μm, the afterflame time measured by the flammability test based on procedure A of ISO 15025:

2016 was 14 seconds or more, and flame retardancy (flameproofness) of the flame-retardant fiber composite of Comparative Example 1 was poor. Also, in Comparative Example 2 using modacrylic fibers containing zinc hydroxystannate with an average particle size D50 of 0.2 µm, the flame-retardant fiber composite was burned down in the flammability test based on procedure A of ISO 15025:2016, and flame retardancy (flameproofness) of the flame-retardant fiber composite of Comparative Example 2 was very poor.

In Reference Examples 1 and 2, molybdenum trioxide was used as a flame retardant. Reference Example 2, which used molybdenum trioxide with an average particle size D50 of less than 0.5 µm, had higher flame retardancy than Reference Example 1, which used molybdenum trioxide with an average particle size D50 of more than 0.5 µm. In Reference Examples 3 and 4, tin dioxide was used as a flame retardant. Reference Example 4, which used tin dioxide with an average particle size D50 of less than 0.5 µm, had higher flame retardancy than Reference Example 3, which used tin dioxide with an average particle size D50 of more than 0.5 µm.

From the above, it can be seen that, although the reason is not clear, flame retardancy of modacrylic fibers is markedly improved when the average particle size D50 of a flame retardant is 0.5 µm or more, which is an unexpected and unique effect when modacrylic fibers combined with a zinc stannate compound as the flame retardant.

The present invention is not particularly limited, but may encompass the following embodiments, for example.

[1] A flame-retardant modacrylic fiber comprising:
a modacrylic copolymer in an amount of 100 parts by mass; and
a zinc stannate compound in an amount of 1 to 18 parts by mass,
wherein the zinc stannate compound has an average particle size D50 of 0.5 µm or more.

[2] The flame-retardant modacrylic fiber according to [1], wherein the zinc stannate compound is zinc hydroxystannate.

[3] The flame-retardant modacrylic fiber according to [1] or [2],
wherein the modacrylic copolymer comprises acrylonitrile in an amount of 30 to 85 mass %, one or more halogen-containing monomers selected from the group consisting of halogen-containing vinyl monomers and halogen-containing vinylidene monomers in an amount of 15 to 70 mass %, and one or more other copolymerizable vinyl monomers in an amount of 0 to 3 mass %.

[4] A method for producing the flame-retardant modacrylic fiber according to any one of [1] to [3], the method comprising:
wet-spinning a spinning solution containing a modacrylic copolymer, a zinc stannate compound, and a solvent,
wherein the spinning solution comprises the zinc stannate compound in an amount of 1 to 18 parts by mass with respect to 100 parts by mass of the modacrylic copolymer, and
in the spinning solution, an average particle size D50 of the zinc stannate compound is 0.5 µm or more.

[5] A flame-retardant fiber composite comprising:
the flame-retardant modacrylic fiber according to any one of [1] to [3] in an amount of 30 to 80 mass %, and
one or more other fibers selected from the group consisting of natural fibers and chemical fibers in an amount of 20 to 70 mass %.

[6] The flame-retardant fiber composite according to [5], wherein afterflame time of the flame-retardant fiber composite measured using a flammability test based on ISO 15025 is 10 seconds or less.

[7] The flame-retardant fiber composite according to [5] or [6],
wherein the other fibers comprise a cellulose fiber.

[8] The flame-retardant fiber composite according to [7], wherein the cellulose fiber comprises a lyocell.

[9] The flame-retardant fiber composite according to any one of [5] to [8],
wherein the flame-retardant fiber composite comprises one or more fabrics selected from the group consisting of a knitted fabric and a woven fabric.

[10] Flame-retardant work clothing comprising:
the flame-retardant fiber composite according to any one of [5] to [9].

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A flame-retardant fiber composite comprising:
a flame-retardant modacrylic fiber in an amount of 40 to 80 mass %, and
a lyocell in an amount of 20 to 60 mass %,
wherein the flame-retardant modacrylic fiber comprises a modacrylic copolymer in an amount of 100 parts by mass; and a zinc stannate compound in an amount of 1 to 18 parts by mass, and
wherein the zinc stannate compound has an average particle size D50 of 0.5 µm or more.

2. The flame-retardant fiber composite according to claim 1,
wherein afterflame time of the flame-retardant fiber composite measured using a flammability test based on ISO 15025 is 10 seconds or less.

3. The flame-retardant fiber composite according to claim 1,
wherein the flame-retardant fiber composite comprises one or more fabrics selected from the group consisting of a knitted fabric and a woven fabric.

4. The flame-retardant fiber composite according to claim 1,
wherein the zinc stannate compound is zinc hydroxystannate.

5. The flame-retardant fiber composite according to claim 1,
wherein the average particle size D50 of the zinc stannate compound is 5 µm or less.

6. The flame-retardant fiber composite according to claim 5,
wherein the average particle size D50 of the zinc stannate compound is 1 µm or less.

7. The flame-retardant fiber composite according to claim 1,
wherein the flame-retardant modacrylic fiber comprises 1.0 to 15.3 mass % of the zinc stannate compound with respect to the total mass of the flame-retardant modacrylic fiber.

8. The flame-retardant fiber composite according to claim 1,
   wherein the modacrylic copolymer comprises acrylonitrile in an amount of 30 to 85 mass %, one or more halogen-containing monomers selected from the group consisting of halogen-containing vinyl monomers and halogen-containing vinylidene monomers in an amount of 15 to 70 mass %, and one or more other copolymerizable vinyl monomers in an amount of 0 to 3 mass %.

9. A flame-retardant work clothing comprising:
   the flame-retardant fiber composite according to claim 1.

10. The flame-retardant work clothing according to claim 9,
    wherein afterflame time of the flame-retardant fiber composite measured using a flammability test based on ISO 15025 is 10 seconds or less.

11. The flame-retardant work clothing according to claim 9,
    wherein the zinc stannate compound is zinc hydroxystannate.

12. The flame-retardant work clothing according to claim 9,
    wherein the average particle size D50 of the zinc stannate compound is 5 μm or less.

13. The flame-retardant work clothing according to claim 12,
    wherein the average particle size D50 of the zinc stannate compound is 1 μm or less.

14. The flame-retardant work clothing according to claim 9,
    wherein the flame-retardant modacrylic fiber comprises 1.0 to 15.3 mass % of the zinc stannate compound with respect to the total mass of the flame-retardant modacrylic fiber.

15. The flame-retardant work clothing according to claim 9,
    wherein the modacrylic copolymer comprises acrylonitrile in an amount of 30 to 85 mass %, one or more halogen-containing monomers selected from the group consisting of halogen-containing vinyl monomers and halogen-containing vinylidene monomers in an amount of 15 to 70 mass %, and one or more other copolymerizable vinyl monomers in an amount of 0 to 3 mass %.

* * * * *